US 6,690,777 B2

(12) United States Patent
Pecht

(10) Patent No.: US 6,690,777 B2
(45) Date of Patent: Feb. 10, 2004

(54) METHOD AND SYSTEM FOR WIRELESS DEVICE INITIATION OF WEB PAGE PRINTOUTS VIA REMOTELY LOCATED FACSIMILE MACHINES

(75) Inventor: Yuval J. Pecht, Kiryat Ono (IL)

(73) Assignee: Comverse, Ltd., Tel Aviv (IL)

( * ) Notice: Subject to any disclaimer, the term of this patent is extended or adjusted under 35 U.S.C. 154(b) by 0 days.

(21) Appl. No.: 10/058,768

(22) Filed: Jan. 30, 2002

(65) Prior Publication Data

US 2003/0142801 A1 Jul. 31, 2003

(51) Int. Cl.$^7$ ............................................. H04M 11/00
(52) U.S. Cl. ............................ 379/100.01; 329/100.02; 329/90.01; 455/466
(58) Field of Search ........................... 379/90.01, 93.05, 379/93.17, 100.01, 100.02–100.09, 88.17; 370/52; 709/206; 455/466

(56) References Cited

U.S. PATENT DOCUMENTS

| 6,157,706 A | | 12/2000 | Rachelson |
| 6,275,575 B1 | * | 8/2001 | Wu ........................ 379/202.01 |
| 2002/0041399 A1 | * | 4/2002 | Ichikawa .................... 358/402 |
| 2002/0142786 A1 | * | 10/2002 | Pradhann et al. ........... 455/466 |

FOREIGN PATENT DOCUMENTS

| EP | 1 037 451 A2 | 9/2000 | |
| JP | 401278149 A | * 11/1989 | .......... H04M/1/274 |
| JP | 02001127900 A | * 5/2001 | .......... H04M/11/00 |

OTHER PUBLICATIONS

PC to Fax Service.
http://www.interpage.net/sub-outfax.html: Interpage ™ Network Services OutFax(sm) Service; Dec. 16, 2001.
http://www.corporate-ir.net/ireye/ir_site.zhtml?ticker=EAST&script=400: Easy Link Services; Easy Link News Releases Jan. 30, 2002.
http://www.easylink.com/home/index.html; Easy Link Services; Jan. 30, 2002.

* cited by examiner

*Primary Examiner*—Melur Ramakrishnaiah
(74) *Attorney, Agent, or Firm*—Sughrue Mion, PLLC

(57) ABSTRACT

A system and method that provides remotely generate facsimile printouts of Web page content, without having to attach a printer or facsimile machine to the device. The system may be configured with a variety of different devices, such as wireless telephones, pagers, Personal Digital Assistants (PDAs), telephones, browsers, and interactive TVs. To initiate a Web page facsimile printout, a device generates a message that includes a Web page location and/or a facsimile machine location. The message is then communicated to a facsimile machine server. The Web page data is obtained and then communicated to one or more facsimile machines for subsequent output.

30 Claims, 3 Drawing Sheets

METHOD AND SYSTEM FOR WIRELESS DEVICE INITIATION OF WEB PAGE PRINTOUTS VIA REMOTELY LOCATED FACSIMILE MACHINES

BACKGROUND OF THE INVENTION

1. Field of the Invention

The present invention relates generally to a system that provides remote output of Web page content, and in particular to wireless devices that initiate printing of Web page content at remotely interfaced facsimile machines.

2. Description of the Related Art

Presently, users of mobile devices, such as wireless phones, pagers, and Personal Digital Assistants (PDAs), are able to view Web pages on these devices. Because of size and technological limitations of these mobile devices, viewing quality is severely limited. For example, some types of mobile devices, such as those that utilize a short message service (SMS) for communication, typically permit the viewing of only several lines of text at a time. Moreover, SMS enabled devices typically do not permit the viewing of graphical images, and merely provide low resolution text images.

Other mobile devices, such as those configured to operate with a wireless application protocol (WAP), may provide a broader range of viewing capabilities and permit the viewing of Web page content that contains text and graphical images. WAP enabled devices also may provide a user with an ability to interact with a Web page, along with providing Web page navigational capabilities. However, in many instances, even the WAP enabled devices do not meet a user's needs to view the entire contents of a Web page.

Mobile device users have attempted to overcome the limited viewing capabilities of their devices by obtaining a printout of a desired Web page. Obtaining a printout of Web page content typically requires the attachment of a printer directly to the mobile device, but this solution has several drawbacks. First, the mobile device must support some type of printer attachment. Although some PDAs, for example, support printer attachment, a vast number of these devices (e.g., wireless phones, pagers, etc.) do not have these capabilities.

Another drawback of current systems relates to a user's dependency on the availability of a printer that can be connected to the mobile device. For example, even if a particular mobile device is capable of printer attachment, the user may not have access to a compatible printer. Users typically utilize mobile devices because of their portability and often do not want the burden of transporting a printer. Accordingly, mobile users must either forego printing Web page content with their devices, or they must transport a printer that may be attached to the mobile device when a printout is desired.

It is to be recognized that the need for providing mobile devices with an ability to print Web page content extends to other devices. Specifically, it is desirable to provide any device that has limited Web page viewing or printing capabilities, with an ability to print Web page content.

One example relates to devices that utilize a television monitor as an interface (e.g., iTV™, WebTV™), which often have limited, if any, printing capabilities. Other devices that typically do not have printing capabilities include telephone systems that are configured with a Text-To-Speech (TTS) system, which permit users to receive text-based messages, and then convert these messages into voice output by using a variety of speech synthesis techniques. Often, the text-based messages will relate to a particular Web page. Although TTS devices may provide voice output relating to Web page content, these systems cannot provide a user with printouts of Web page content. It is therefore also desirable for those who receive text-based content via TTS devices to be able to obtain printouts of Web page content identified and/or described in the text-based messages. The ability to obtain these Web page printouts via remotely located facsimile machines, without the use of a printer, is also needed.

SUMMARY OF THE INVENTION

In view of the foregoing, and in accordance with one aspect of the present invention, a mobile device user can initiate a facsimile printout of a desired Web page at a desired facsimile machine, even though the device and the facsimile machine are not directly connected.

In accordance with this and other aspects of the present invention, a Web page facsimile printing system includes a plurality of different types of mobile devices that may be connected to a facsimile machine server via an interface gateway. The facsimile machine server and at least one facsimile machine are also in communication, providing a communication path between each of the different mobile devices and at least one facsimile machine. In this aspect of the present invention, Web page data may be generated by utilizing a Web page location. Once the Web page data is generated, it may be communicated to a remote facsimile machine for subsequent output.

In accordance with one aspect of the present invention, the different types of mobile devices may include a wireless telephone, a pager, or a Personal Digital Assistant (PDA). In addition to these, other devices may include a telephone with TTS capability, a browser-enabled device or an interactive television.

In accordance with another aspect of the present invention, the mobile devices may utilize a wireless communication system for message communication.

In accordance with another aspect of the present invention, a message may be generated at a mobile device, wherein the message includes a Web page location and/or a facsimile machine location.

In accordance with yet another aspect of the present invention, a message may be communicated from a mobile device to a facsimile machine server, without utilizing an email server.

In accordance with another aspect of the present invention, message formatting and communication may utilize a Short Message Service (SMS) protocol, or a Wireless Application Protocol (WAP).

In another aspect of the present invention, the identification of the facsimile machine and Web page locations may be performed at the user's device or at an interfacing system.

In still yet another aspect of the present invention, a mobile device is provided with an ability to remotely generate printouts of Web page content, without having to attach a printer to the mobile device. In this aspect, the mobile device has an ability to utilize remotely located facsimile machines to provide Web page printouts, thereby eliminating the need for a printer.

These and other aspects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

In the following description of a preferred embodiment, reference is made to the accompanying drawings, which form a part hereof, and which show by way of illustration a specific embodiment of the invention. It is to be understood by those of working skill in this technological field that other embodiments may be utilized, and structural changes may be made without departing from the scope of the present invention.

Figure 1:
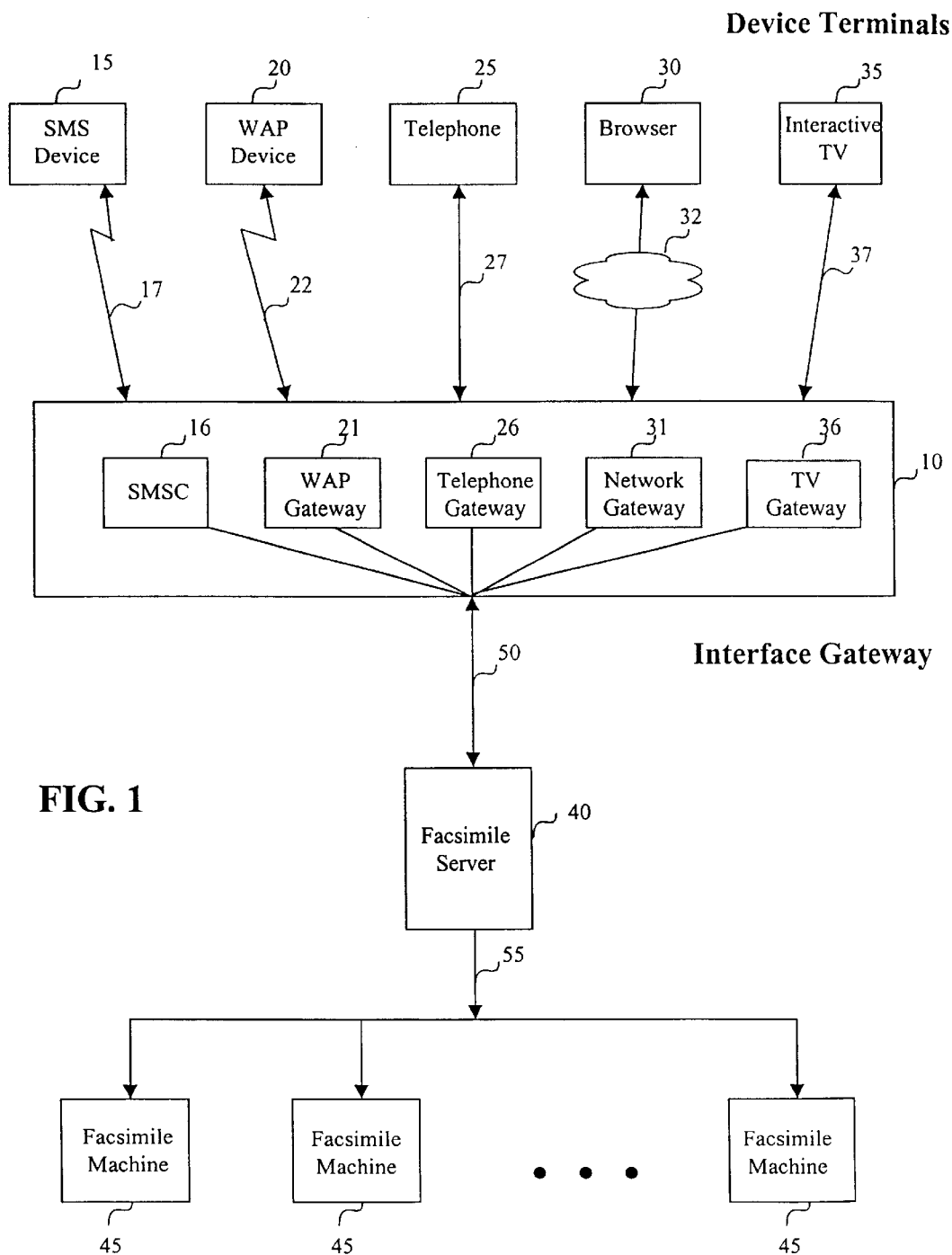
FIG. 1 is a block diagram illustrating an overview of a Web page facsimile printing system and the relative relationship among several of the major modules comprising this system.

FIG. 1 provides an overview of a Web page facsimile printing system, along with the relative relationship among several of the major modules comprising this system. Several examples of the various types of device terminals that may be utilized in the present invention are shown in communication with an interface gateway 10. More specifically, a SMS device 15, WAP device 20, telephone 25, browser 30, and an interactive TV 35 are shown in communication with interface gateway 10. Although facsimile server 40 is shown in communication with several facsimile machines 45, one of ordinary skill will understand that a single facsimile machine 45 may be used. In the illustrated configuration, facsimile server 40 provides a communication link between the device terminals and facsimile machine 45. Each of the exemplary device terminals, and their respective communication links, will now be described.

SMS device 15 represents any of the known wireless devices that may be configured to communicate and/or receive SMS text-based messages. Typical SMS enabled devices include cellular phones, pagers, and Personal Digital Assistants (PDAs). The protocol used by SMS device 15 may include any of the known protocols that support SMS messaging. It is known in the art that SMS is a point-to-point or point-to-multipoint service which enables communication of messages (i.e., transmit and/or receive) between communication network users. A typical SMS enabled device permits a user to receive, read, write, edit, save, and send messages. SMS enabled devices typically provide viewing of one or more lines of text on a display panel.

WAP device 20, on the other hand, represents any of the known wireless devices that communicate using a wireless protocol, such as wireless application protocol (WAP). Typical WAP enable devices include cellular phones, pagers, and PDAs. In contrast to SMS enabled devices, WAP enabled devices provide a more robust user interface and are not limited only to displaying text (which is typical of an SMS enabled device). WAP devices typically support Web page browsing and other Web page interactions.

Although several SMS and WAP devices have been described (e.g., mobile phone, pagers, PDAs, etc.), the present invention is not so limited and may be configured to cooperate with any device that is SMS and/or WAP enabled.

Since SMS protocols and messaging standards of SMS enabled devices, as well as the various WAP communication protocols, are known in the art, no further description of these protocols is provided in this specification.

In a typical configuration, SMS device 15 is in wireless communication with a Short Message Service Center (SMSC) 16, via wireless link 17. Likewise, WAP device 20 is in wireless communication with WAP gateway 21, via wireless link 22. Wireless links 17 and 22 may include, for example, any of the known wireless communication protocols that support SMS messaging and/or WAP communications (e.g., GSM, TDMA, CDMA). Although separate wireless links are illustrated for the SMS and WAP devices 15 and 20, it should be understood that a single wireless link capable of communicating WAP and SMS messages may be utilized.

SMS message processing at the SMSC 16 includes the necessary services to provide message communication to and from SMS device 15. The SMSC 16 also provides message formatting so that a SMS message may be communicated to facsimile server 40. Likewise, WAP gateway 21 may be configured to provide the necessary services (e.g., message formatting) that facilitate communication to and from WAP device 20. Techniques for SMS message processing at SMSCs, along with WAP message processing at WAP gateways are known in the art.

FIG. 1 also shows browser 30 in communication with network gateway 31, via network link 32. These elements 30–32 may be provided in addition to the wireless communication-based portions of the invention described above. Browser 30 may comprise, for example, a computer system or any other device that provides access to Web sites and associated Web pages. Computer systems that are compatible with the present invention include, for example, personal computers, server based workstations, and portable computers. Browser 30 may interact with connected systems (e.g., Web sites) by utilizing, for example, a Web browser (e.g., Netscape™, Internet Explorer™). However, it is to be appreciated that the network interface aspect of the present invention is not limited to Web browsers, and any known device or system that permits Web page navigation and/or viewing may be appropriate.

Network link 32 may include, for example, a local area network (LAN), a wide area network (WAN), a metropolitan area network (MAN), or the Internet. Communication involving input/output operations with this network may comprise any of the known network application protocols, (e.g., HyperText Transfer Protocol (HTTP), File Transfer Protocol (FTP), Windows Internet Name System (WINS), Simple Mail Transfer Protocol (SMTP), etc.)

The extendible nature of the present system is illustrated by one aspect of the present invention that provides additional interfacing devices, such as telephones and interactive televisions (TVs). FIG. 1 shows a telephone 25 in communication with a telephone gateway 26, via telephone link 27. FIG. 1 further shows an interactive television (TV) 35 in communication with TV gateway 36, via TV link 37. Telephone 25 and interactive TV 35, along with their respective communication links, will be described in more detail with respect to FIG. 2.

Network gateway 31, telephone gateway 26, and TV gateway 36 provide services that are necessary for proper message routing, as well as attendant message formatting. That is, each of these gateways may be configured with the necessary software and/or hardware to facilitate communication between the respective device terminals and the facsimile server 40. Since gateways that provide these types of services are well known in the art, they will not be further described. For example, services are available that allow a user to fax from the Internet or by e-mail (e.g., www.savetz.com/fax and www.fax-away.com/services).

Although FIG. 1 shows the incorporation of each individual gateway interface (e.g., SMSC 16, WAP gateway 21, telephone gateway 26, network gateway 31, and TV gateway 36) into a single interface gateway 10, the present invention is not so limited. Thus, it is to be understood that one or more of the individual gateway interfaces may be implemented as a separate gateway. It should also be understood that interface gateway 10 also may be implemented on the server side of the present invention, and therefore may be integrated with facsimile server 40.

FIG. 1 next shows facsimile server 40 in communication with interface gateway 10, via server link 50. One feature of facsimile server 40 provides processing for print request messages received from the device terminals. Message processing at the facsimile server 40 may include identifying a particular Web page uniform resource location (URL) that is to be printed, the facsimile machine 45, along with acquiring and formatting data relating to the Web page content (i.e., the content located at the specified Web page URL).

Figure 3:
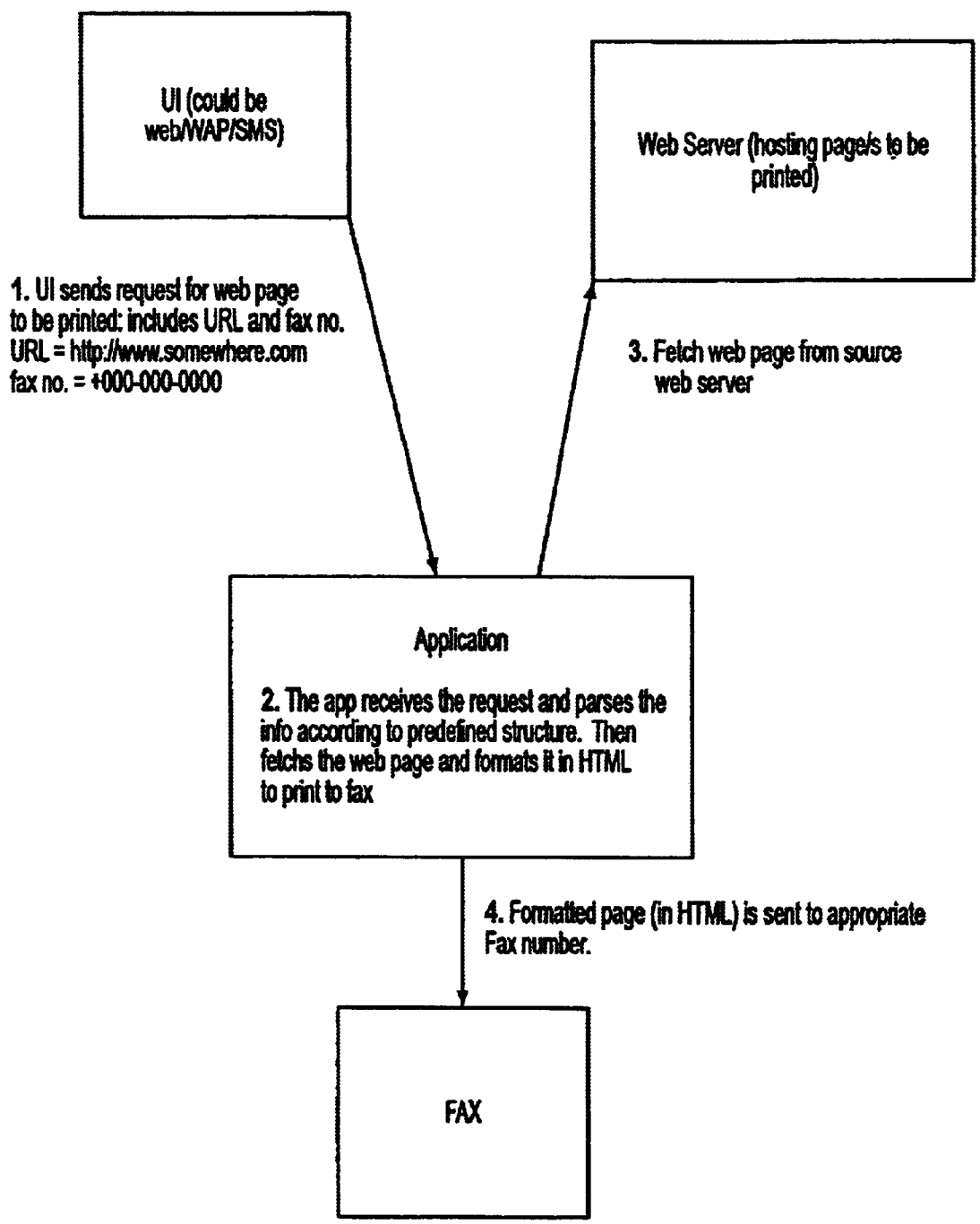
FIG. 3 is a flow chart illustrating the operation of an exemplary facsimile server.

Facsimile server 40 typically utilizes information contained in the print request message to identify the requested Web page as well as to identify the appropriate facsimile machine 45. A Web page URL, for example, may be utilized by the facsimile server 40 to locate the Web page. The facsimile machine may be identified by the public phone line number that connects the facsimile machine, or other information such as a URL of a networked facsimile machine. The facsimile server 40 may utilize any of a variety of known techniques for parsing messages to identify the Web page URL and facsimile machine number. Systems that provide message parsing typically contain intelligence that can parse incoming print request message to identify the necessary information (e.g., URLs and phone numbers). FIG. 3 is a flow chart showing the operation of facsimile server 40. In operation 1, the User Interface (UI) sends a request for a web page to be printed. The request includes the URL and facsimile number (e.g., URL=http://www.somewhere.com, Fax. No.=+000-000-000). In operation 2, the application receives the request and parses the information according to predefined structure, and then fetches the web page from the source web server (operation 3) and formats it in HTML in order to print to a facsimile machine (operation 4).

Additional techniques utilized by facsimile server 40 to identify a facsimile machine include the identification of the sender or the source of the print request message. For example, this may be provided by the sending server using telephony identification or IP identification. Based on this information, a particular facsimile machine location may be provided as a default, for example. Using the default facsimile machine technique permits Web page printouts without the user providing a facsimile machine number. A default facsimile machine may be established via Web or WAP personal provisioning in which subscriber data (e.g., the default facsimile machine number) is kept in a database within the system. Alternatively, a user could be queried at the time of sending the print request message whether the default location should be used. For example, the user can enter this information through whichever user interface the use employs (e.g., on WAP interface, the user is presented with a WAP page, called a "card", which queries the user). Each of the just-described techniques also may be used to identify a desired Web page that is to be printed. For example, the facsimile server 40 may be configured to printout a predefined (or default) Web page based on the sender (i.e., the subscriber's parameters may be stored in a data base) or the source of the print request message. The subscriber that initiated the print request may be identified by the subscribers MSISDN, for example. In this particular example, the print request message would not have to contain information relating to either the Web page URL or the facsimile machine number since this could be determined at the facsimile server, by querying the subscriber's profile in the data base. Accordingly, it is to be understood that Web page facsimile printouts may be obtained without a user having to provide the Web page or the facsimile machine number.

Once the desired Web page has been identified, facsimile server 40 then acquires data representing the Web page content, and formats this data so that it may be communicated to facsimile machine 45. A variety of techniques for acquiring and formatting Web page content for facsimile machine printing are well known in the art (e.g., formatting web pages according to HTML standards), and any of these techniques may be utilized in the present invention.

As shown in FIG. 1, a facsimile machine 45 is in communication with the facsimile server 40, via facsimile link 55. In one aspect of the present invention, facsimile link 55 may utilize a public telephone line, such as a Public Switched Telephone Network (PSTN). Additional methods for implementing facsimile link 55 include, for example, any of the methods utilized for providing communication between the device terminals (e.g., SMS device 15, WAP device 20, telephone 25, etc.) and the interface gateway 10. Thus, facsimile link 55 may include one or more of the communication methods utilized by wireless links 17 and 22, telephone link 27, network link 32, TV link 37, as well as a public telephone line. It should also be appreciated that where the network 31 is not incorporated in facsimile server 40, server link 50 may comprise any of the communication methods utilized by facsimile link 55.

Although one aspect of the present invention utilizes a single facsimile machine 45 for generating output (i.e., Web page facsimile printout) the utilization of a plurality of facsimile machines is contemplated. Where a plurality of facsimile machines is utilized, it should be understood that each facsimile machine may use the same type of facsimile communication link. That is, facsimile link 55 utilized by each facsimile machine 45 may comprise, for example, a network connection, a wireless communication link, or a public telephone line (e.g., PSTN). However, the present invention is not so limited and may be configured to provide each facsimile machine with a different type of communication link. Thus, one facsimile machine may utilize a public telephone line while another facsimile machine utilizes a network connection, for example.

It is to be understood that the devices that initiate Web page facsimile printing do not necessarily have to provide the requisite Web page content information (i.e., the data representing the Web page) to generate facsimile printouts. This is typically done by the device user providing the location of the Web page (i.e., the Web page URL). The facsimile server 40 acquires the Web page data according to the provided location, and the data is ultimately communicated to the facsimile machine 45. However, it should be appreciated that the present invention may be configured so that information communicated from a device is provided to facsimile machine 45 for output. The types of information that a device may communicate may include Web page content and other data obtained from a Web page. Thus, in this example, a device may generate its own data relating to Web page content, so that the device is not necessarily reliant on facsimile server 40 providing all of the Web page content data. For example, sending the URL for a particular map site with the desired location specification specified in the command will cause the web server to receive the appropriate data from the web site to be printed via facsimile. In other words, for web sites http://map.yahoo.com or http://www.mapquest.com. the user could send the following message: maps.yahoo.com 312-312-3122 7060 Nowhere Ave. New York, N.Y. 100006. In response to this message, a map of the location 7060 Nowhere Ave. in New York will be sent to facsimile number 312-312-3122.

Print Request Communication Path

Figure 2:
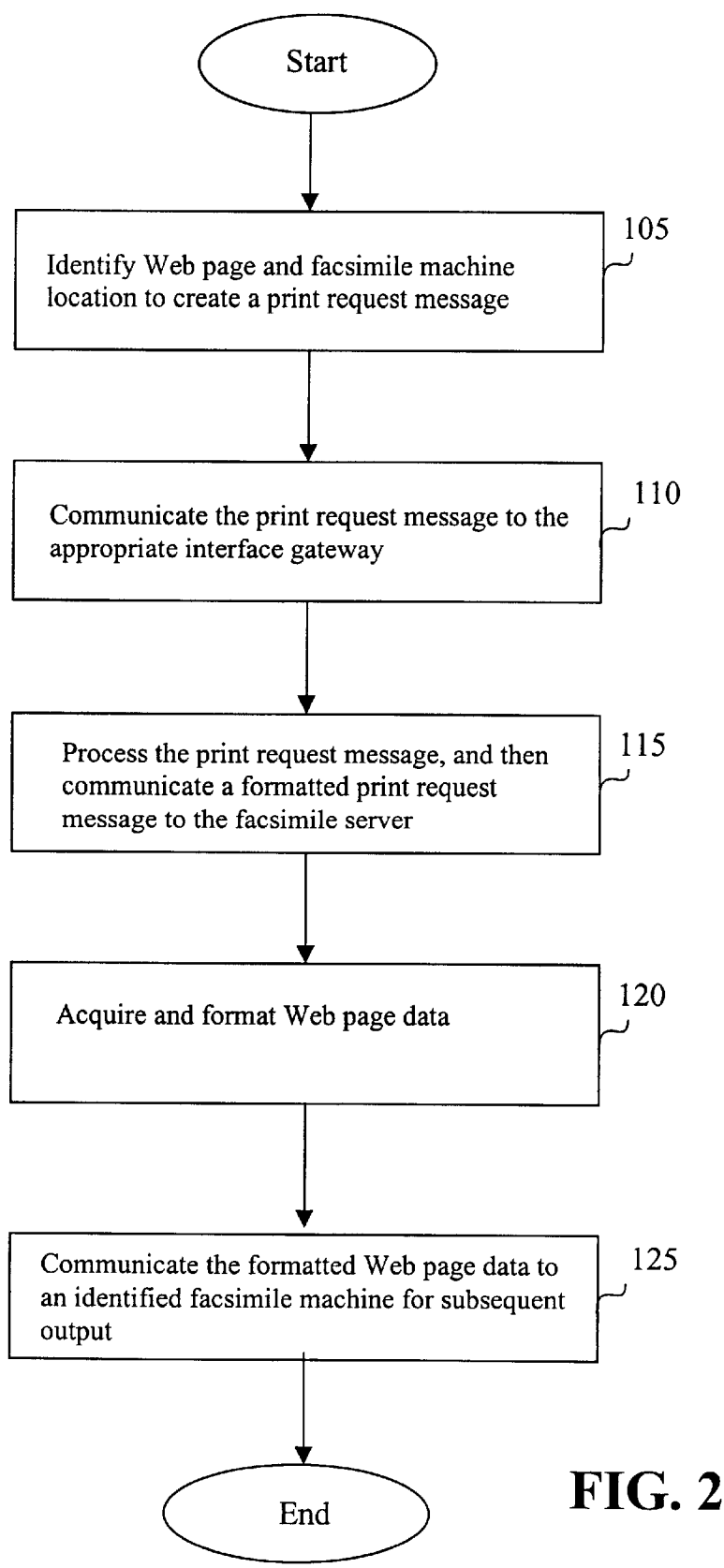
FIG. 2 is a block diagram illustrating an exemplary facsimile machine print request communication path.

Referring now to FIG. 2, an exemplary print request communication path from several devices, ultimately resulting in a Web page printout via a remotely located facsimile machine, will now be described. It is to be understood that print request generation, communication, and processing may vary depending on the type of device utilized. However, each of the exemplary devices that will be discussed follows a general processing flow.

In one embodiment, facsimile machine printouts of Web page content may be initiated by SMS device 15. For reasons that will become clear, a generated SMS message according to the invention will typically include information that identifies a particular Web page (e.g., a Web page URL) as well as identifying the facsimile number of the machine that is to provide the printout (105). Several procedures for generating facsimile machine numbers and Web page URLs will now be discussed.

Facsimile numbers may be obtained, for example, from input entered at the SMS device 15 (e.g., a user entering the number via a keypad). Facsimile numbers also may be retrieved from a storage location (e.g., RAM, ROM, magnetic or optical storage medium, etc.) Facsimile number storage locations may reside in the subscriber's profile at the SMS device 15, or at other locations, such as the SMSC 16 or facsimile server 40. The facsimile number also may be retrieved from information contained within a previously received SMS message (e.g., an email or page).

The Web page URL may be obtained by any of the methods used to obtain the facsimile number. That is, the Web page URL may be generated by user input, or retrieved from a storage location residing at SMS device 15, SMSC 16, facsimile server 40, or in another SMS message.

One particular example of how a facsimile number and Web page URL may be identified will now be described. A user may receive an SMS message, such as an email, at the user's SMS device 15. In this example, the email contains content information (e.g., URL) that relates to a particular Web page. This may occur, for example, by a friend sending a message to the user about an interesting Web site. Typically, Web page content is displayed as a text message on the SMS device 15. Even though the SMS device 15 user may like to view the entire Web page (e.g., text, graphics, pictures etc.), he/she is unable to do so because of the limited viewing capabilities of the SMS device 15. Since the user would like to view the contents of this particular Web page, the user incorporates the Web page URL into a new SMS message created by the user. The user could also specify the facsimile number that is to be used to print the particular Web page, and incorporate this information into the newly created SMS message.

Another method for identifying a facsimile number and Web page URL is for a user to create an SMS message having the necessary information, without the user having to rely upon a previously received email or SMS message. For example, a user may create a new SMS message that contains a Web page URL as well as the facsimile number where the user desires the printout. It is to be realized that in either example, the user can create a new SMS message by any of the known SMS message creating interfaces (e.g., keypad, stylus, touch screen, etc.)

Once the Web page URL and facsimile number information have been identified, they are appropriately formatted so that the print request (i.e., message) may be communicated to the SMSC 16. This information may be specified as a format within the textual message: URL:FaxNo. For example, the SMS message may include the following string of characters: #urlfax www.wow.now 212-333-42424. The server application will recognize that #urlfax identifies the URL to Fax service, and process it accordingly. The present invention accommodates several different communication formats for sending print request messages. In one embodiment, SMS device 15 may send a print request via an SMS based message. The Web page URL and facsimile number may be inserted into an SMS message utilizing one of the known SMS messaging formats. In contrast to email, SMS based communications do not require the use of email servers, and do not require a wireless email communication protocol. It should therefore be understood, that facsimile print requests initiated from SMS device 15 may utilize SMS messaging formats, without the need for a system that supports email communications. This aspect of the present invention therefore provides wireless devices, which are not email enabled, with an ability to print Web page content via remotely located facsimile machines.

Additionally, where an email format is utilized, the Web page URL and facsimile number may be incorporated into an email message. A print request using an email format then may be communicated by SMS device 15 using any of the known wireless email protocols.

Although message generation has been described with respect to a user entering the necessary information (e.g., facsimile number and/or Web page URL), it should be understood that some or all of this information may be automatically provided. That is, a user would not have to enter the facsimile number and/or Web page URL into the message because this information would be provided by another system (e.g., SMS device 15, facsimile server 40, etc.) via subscriber profile in the data base. Once the print request (i.e., a message containing the Web page URL and facsimile line number) has been appropriately formatted, the message is communicated to the SMSC 16 for processing (110). As previously noted, standard message processing at the SMSC 16 relates to the services necessary to receive the SMS message and subsequently communicate the message to the facsimile server 40. After processing at the SMSC 16, the SMS message is communicated to the facsimile server 40 (115).

Next, facsimile server 40 receives the message and performs any processing that may be necessary. As described in reference to FIG. 1, processing at the facsimile server 40 may include identifying the particular Web page URL that is to be printed, along with acquiring and formatting the data relating to the Web page content (i.e., the content located at the specified Web page URL) (120).

Facsimile server 40 also identifies the appropriate facsimile machine to which the formatted Web page data is to be communicated. Typically, the facsimile machine will be identified from information obtained from the message, which may include the public phone line number that connects the facsimile machine, or other information such as a URL of a networked facsimile machine. At this stage of message processing, facsimile server 40 has acquired and appropriately formatted (e.g., using standard HTML) the data relating to the identified Web page, and has identified the location of facsimile machine 45. Next, facsimile server 40 communicates the formatted Web page data to the identified facsimile machine (or machines) (125). Facsimile machine 45 receives the formatted Web page data and then provides an output, resulting in a printout of the identified Web page.

The just described operations illustrate one aspect of the present invention that permits a wireless device user to initiate facsimile printouts of Web page content, even though the wireless device is incapable of viewing Web page content (as printed). Moreover, facsimile printouts of Web page content are provided even though the wireless device does not support direct printer or facsimile machine attachment.

WAP Device

An exemplary facsimile print request initiated by a wireless WAP device 20 will now be described. Facsimile printing of Web page content based on messages communicated by WAP device 20 also requires the identification of the Web page URL and the facsimile machine line number.

Similar to the identification methods utilized by SMS device 15, the WAP device 20 may identify Web page URLs and facsimile machine numbers based on information obtained from the WAP gateway 21, facsimile server 40, or from a storage location that resides at the WAP device 20. However, since WAP device 20 is configured with capabilities that are not commonly found on SMS devices 5 (e.g., Web page navigation and/or viewing), WAP device 20 may utilize additional methods to identify Web page URLs and facsimile line numbers.

It is well known in the art that WAP enabled devices have enhanced Web page viewing and interaction capabilities by virtue of the wireless protocol, WAP. In accordance with one aspect of the present invention, WAP enabled devices may utilize these additional capabilities to identify Web page URLs and facsimile machine numbers (105).

For example, a user may utilize a WAP device 20 to access a particular Web page. While viewing this Web page, the user may wish to have a facsimile printout of the currently viewed Web page. Using WAP device 20, a user may then enter or otherwise copy the Web page URL into a print request message, which is ultimately communicated to facsimile server 40 (e.g., a command within the WAP page-"print to fax").

A variety of different methods may be used to identify a facsimile number so that it can be incorporated into a print request message. One example is where the user enters the necessary information (e.g., keypad entry) so that it is placed into the print request message. In this example, the user would typically have some knowledge of the number and location of the facsimile machine.

In another example, a user could be provided access (via WAP device 20) to a particular Web site that provides facsimile machine information, so that the user would not be required to have any prior knowledge of this information (e.g., number or location of the machine). An appropriate Web site could contain one or more Web pages that contain information relating to available facsimile machines. The information could be made available to the Web site via an appropriate database or inserted in the Web page HTML code, for example. Information may include the public phone line numbers or the physical location of available facsimile machines (e.g., hotel lobby, copy center, etc.) A purpose of such a Web site would be to provide business persons or travelers access to facsimile machine information. For example, a business traveler could access a Web site and locate a facsimile machine number of the hotel that he/she is staying. The traveler could then enter the located facsimile number into the print request message so that the desired Web page may be printed at the hotel's public facsimile machine.

These informational Web sites may be provided, for example, by the device manufacturer (e.g., SMS device 15, WAP device 20, etc.), or by one who provides the facsimile server 45, or even by a party who is supplying the facsimile machine (e.g., the hotel, copy center, etc.) Obtaining facsimile machine information via a Web page illustrates an aspect of the present invention that permits a user to obtain Web page printouts at a variety of locations where this information may not be previously known to the user. However, the present invention is not limited to obtaining facsimile machine information from Web pages or databases. Thus, while the present invention may be configured to utilize these methods, the present invention does not rely on Web pages and databases for facsimile information. In other words, it is to be understood that the identification of Web page and/or facsimile machine numbers can be performed by a user (e.g., key pad entry), without the reliance upon a connected database or Web page for this information.

Next, WAP device 20 communicates a message, which contains the Web page URL and facsimile number, to the WAP gateway 21 where further processing (e.g., standard WPA GW function) may occur (Operation 110). In one embodiment, the WAP device 20 may communicate this message, for example, via a command from the WAP device 20. The command may be within the WAP page ("card") e.g., "print to fax".

In contrast to email, WAP command communications do not require the use of an email server, and do not require a wireless email communication protocol. Where the print request is communicated utilizing a WAP command (e.g., print to fax), the URL and facsimile number are incorporated into a message that is formatted as a WAP command. Any of the known WAP command formatting techniques (e.g., WAP WML standard) may be used to generate this type of print request message. Similarly to the utilization of an SMS messaging standard for print request messaging, WAP command messaging formats also do not require email support systems. That is, wireless devices that are not enabled to send/receive email messages may be provided with an ability to print Web page content via remotely located facsimile machines by utilizing the WAP command messaging format (e.g., WAP WML standard).

Additionally, if an email format is utilized instead of the WAP command format, then the Web page URL and facsimile number can be incorporated into an email message and communicated to the WAP gateway 21 using the appropriate wireless email protocols (discussed with respect to the SMS embodiment).

Next, WAP gateway 21 receives the formatted message and provides the appropriate processing using standard WAP Gateways)(operation 115). In a manner similar to an SMS message, WAP message processing at the WAP gateway 21 may include formatting the WAP message so that it may be communicated to the facsimile server 40.

The WAP gateway 21 then routes the message to the facsimile server 40 where the Web page data is generated for later communication to the identified facsimile machine 45 (120). Once a message initiated from a WAP device 20 reaches the facsimile server 40, further processing occurs in a manner that is similar to the SMS embodiment (and other embodiments). Specifically, facsimile server 40 identifies the particular Web page URL that is to be printed (the URLs and fax numbers have standard identification formats), along with acquiring and formatting the data (using HTML standards) relating to the Web page content (125). After the formatting process, facsimile server 40 communicates the formatted Web page data to the identified facsimile machine (or machines) where a facsimile printout of the identified Web page may be generated.

Telephone

Another embodiment of the present invention provides facsimile printing of Web page content based on communications initiated by a telephone 25 which makes use of text-to-speech (TTS) capabilities to listen to text messages. The telephone 25 embodiment will now be described with reference to FIG. 2.

As described in reference to the other embodiments, it is typically necessary to identify the Web page URL and the facsimile machine line number (105). In a typical configuration, telephone 25 may receive a message, such as an email, that is processed by a text-to-speech (TTS) engine. A TTS engine, as will be appreciated by one of ordinary skill in the art, converts text (i.e., data) into voice output. The TTS engine's text-to-speech conversion process may utilize any of the known synthesizing techniques. For example, Lucent TTS product (http://www.lucentssg.com/speechPortal.html or AT&T product http://www.research.att.com/'mjm/cgi-bin/ttsdemo TTS engines may be used. Accordingly, a text-based message sent to a telephone 25 may be subsequently converted by a TTS engine into a voice message that may be accessed by the telephone 25.

A TTS engine utilized in one embodiment of the present invention may be configured with an ability to recognize incoming data that represents a Web page. That is, the TTS engine may be configured to identify Web page URLs that have been communicated and received by the telephone 25. This capability of TTS engines is well known, and so is not described here in detail. Once the TTS engine recognizes a Web page URL, the TTS engine can offer the user an option to print this Web page to a specified facsimile machine. Similar to the methods utilized by the other embodiments, the telephone 25 may identify the appropriate facsimile number and/or Web page URL based on data that resides at the telephone 25, the telephone gateway 16, or the facsimile server 40.

The telephone 25 also may be used to accept input from a user to identify a facsimile machine 45. Examples of user input include voice and keypad entry. Specifically, a user may be prompted to enter "1" on the telephone keypad to initiate a facsimile printout of the Web page content contained in the received message. Another option may allow a user to enter the public telephone line number of the facsimile machine (e.g., 555-1234).

Interactions involving telephone 25, such as user prompting, accepting user input, as well as TTS engine functionality, may be accomplished by a variety of known communication messaging products. For example, one available system that provides the necessary message communication requirements to support interactions involving telephone 25 is the Trilogue INfinity™ system, produced by Comverse Network Systems, Inc. One of ordinary skill could easily configure the present invention so that it cooperates with a messaging system, such as the Trilogue INfinity™ system. In particular, such a messaging system may be provided so that it cooperates with the facsimile server 40 and telephone gateway 26 to enable the necessary interactions which may occur between telephone 25 and facsimile server 40.

Although the specific example described above implements the Trilogue INfinity™ system as a messaging platform, the present invention is not limited to such a system. Clearly, one skilled in the art will appreciate that the invention may use any electronic messaging platform with any architecture, provided that such a platform has the necessary communication capabilities.

Once the facsimile machine number and Web page URL are identified, the user issues a command (e.g., voice, keypad entry, etc.) from the telephone 25 that communicates a message to the telephone gateway 26. Similarly to the messages communications in the other embodiments, a message sent from the telephone 25 contains data identifying the Web page URL and facsimile machine 45 (110).

Once the telephone gateway 26 receives this message, the appropriate processing may be performed (e.g., formatting) (115). Next, the telephone gateway 26 routes the message to the facsimile server 40 where the Web page data is generated and prepared for communication to the identified facsimile machine 45. In a manner similar to the other embodiments, facsimile server 40 identifies the particular Web page URL that is to be printed, along with acquiring and formatting the data relating to the Web page content (120). After the formatting process, facsimile server 40 communicates the formatted Web page data to the identified facsimile machine (or machines) where a facsimile printout of the identified Web page may be generated (125).

Browser

Another embodiment of the present invention provides not only one or more of the foregoing features, but also Web page facsimile printing based on communications initiated from browser 30 that provides access, for example, to the Internet. In this browser embodiment, which may utilize any of the known Web browsers, a variety of different methods for Web page URL and facsimile number identification may be utilized (105). For example, existing Word files are able to identify a URL (e.g., when a user starts to type "www. in a Word file, the software recogonize the word as a URL and changes the color of the text to blue). This same method can be used to identify an address of the format www.nowhere-.com as a URL. In addition, existing web-browsers themselves have sophisticated features to handle partial address (for instance, if a user enters "nowhere.com", the web browser will search for www.nowhere.com. Regarding phone numbers, existing features in Outlook are able to "suggest" corrections if the user misses some of the telephone digits. A similar method could be employed for fax number identification. It should first be understood that a Web browser typically provides more robust Web page viewing and navigational capabilities, as compared to the presently more limited SMS and WAP enabled devices. Accordingly, it should be understood that the generation of the required information (e.g., Web page URL and facsimile line number) may be accomplished by any of the methods utilized by the other embodiments. Thus, a Web browser may obtain the Web page URL and/or the facsimile number from sources that reside at the browser 30 (e.g., RAM, ROM, and local storage devices etc.), the network gateway 31, and the facsimile server 40.

Additional sources for acquiring this information include accessing a particular Web page, obtaining the information from a previously received email, or by accessing a Web page that contains Web page URLs or facsimile machine numbers (as discussed in reference to the WAP device embodiment). Next, browser 30 communicates a message, which contains the Web page URL and facsimile number, to the network gateway 31 (110). The browser 30 may communicate this message, for example, by incorporating the message into an email. Any of the known email messaging protocols (e.g., SMTP), along with any other messaging protocols that are compatible with network link 32 also may be utilized. In addition, the browser may user server-side commands, e.g., a button on the web page to print that specific web page to fax. Moreover, this feature can be integrated to the browser itself by adding a button or menu command within the browser to print a page to fax. Network gateway 31 then receives the formatted message so that the appropriate processing may be performed (115). Additional processing at the network gateway 31 may include message formatting. Network gateway 31 then routes the message to the facsimile server 40 where the Web page data is generated and prepared for communication to the identified facsimile machine 45 (120). Similar to the other embodiments, facsimile server 40 identifies the particular Web page URL that is to be printed, along with acquiring and formatting the data relating to the Web page content. After the formatting process, facsimile server 40 communicates the formatted Web page data to the identified facsimile machine (or machines) where a facsimile printout of the identified Web page may be generated (Step 125).

Interactive TV

Another aspect of the present invention provides not only the previously described SMS-based, WAP-based or telephone/TTS-based features, but also interactive TV 35 that generates Web page facsimile printing, and this embodiment will also be discussed with reference to FIG. 2. Similar to the other device terminals (e.g., mobile phones, pagers, PDAs), an interactive TV 35 typically does not support direct printer/facsimile machine attachment, and it is therefore not currently possible to obtain easily Web page printing with these systems.

One example of an interactive TV 35 that may be utilized with the present invention is the iTV™ system. As understood by one of ordinary skill in the art, an iTV™ system provides two-way communication between a TV viewer and TV service providers. Another example of an interactive TV 35 relates to the WebTV system™ which provides a user with access to the Internet. As such, the iTV™ system, as well as the WebTV™ systems, typically allow a user to utilize a standard TV and appropriate Web browser, for example, to engage in a variety of Web site interactions (e.g., Web page browsing). While iTV™ and WebTV are provided here as exemplary TV interfaces, other TV-based systems, which enable user interaction, may be used.

Since the interactive TV 35 may utilize a Web browser, Web page URL and facsimile number identification may be performed in a manner similar to that utilized in the browser 30 embodiment (discussed above) (105). Once the Web page URL and facsimile number are identified, a message with this information is communicated to the TV gateway 36 where further processing may occur (110). At this point, the Web browser message is further processed, routed, and printed at the appropriate facsimile machine in a manner similar to that described in the browser embodiment. Accordingly, the processing performed at operations 115, 120, and 125 may be done in a manner similar to that discussed with reference to the browser embodiment, and include server-side commands and browser buttons or menu commands.

While the invention has been described in detail with reference to disclosed embodiments, various modifications within the scope and spirit of the invention will be apparent to those of working skill in this technological field. Therefore, the invention properly is to be construed with reference to the appended claims.

What is claimed is:

1. A wireless communication system for initiating a facsimile printout of a desired Web page, said system comprising:

a device terminal that provides an SMS message, the message including at least one of Web page location identifying information and facsimile machine location identifying information; and a facsimile server responsive to said SMS message for providing the identified Web page to the identified facsimile machine for printout, and further comprising an SMSC for receiving the SMS message from said device terminal, said facsimile server receiving the SMS message from the SMSC, and forwarding the identified Web page to the identified facsimile machines.

2. The system according to claim 1, wherein said Web page location is identified from a Uniform Resource Location (URL) of said identified Web page.

3. The system according to claim 1, wherein said device terminal stores a plurality of different facsimile machine locations.

4. The system according to claim 3, wherein the message includes a selected one of the stored facsimile machine locations.

5. The system according to claim 1, wherein said device terminal includes an input unit, and wherein a user provides at least one of said facsimile machine location identifying information and said Web page location identifying information via said input unit.

6. The system according to claim 1, wherein said facsimile machine location identifying information is obtained from a Web site.

7. The system according to claim 1, wherein said device terminal is selected from the group consisting of a wireless telephone, a pager, a Personal Digital Assistant (PDA).

8. A wireless communication system for initiating a facsimile printout of a desired Web page, said system comprising:

a device terminal that provides a WAP message, the message including at least one of Web page location identifying information and facsimile machine location identifying information; and a facsimile server responsive to said message for providing the identified Web page to the identified facsimile machine for printout, and further comprising a WAP gateway for receiving the WAP message, said facsimile server receiving the WAP message from the WAP gateway, and forwarding the identified Web page to the identified facsimile machine.

9. The system according to claim 8, wherein said Web page location is identified from a Uniform Resource Location (URL) of said identified Web page.

10. The system according to claim 8, wherein said device terminal stores a plurality of different facsimile machine locations.

11. The system according to claim 10, wherein the message includes a selected one of the stored facsimile machine locations.

12. The system according to claim 8, wherein said device terminal includes an input unit, and wherein a user provides at least one of said facsimile machine location identifying information and said Web page location identifying information via said input unit.

13. The system according to claim 8, wherein said facsimile machine location identifying information is obtained from a Web site.

14. The system according to claim 8, wherein said device terminal is selected from the group consisting of a wireless telephone, a pager, a Personal Digital Assistant (PDA).

15. A method that provides a facsimile output of a desired Web page, said method comprising:
    creating a message at a communication device, the message including one of Web page location identifying information and facsimile machine location identifying information; and
    augmenting the message such that said message can cause facsimile printout of the identified Web page at the identified facsimile machine, wherein said created message includes facsimile machine location identifying information, and wherein the Web page location identifying information is automatically added to the created message, wherein a user enters the facsimile machine location identifying information in creating the message, and wherein the Web page location identifying information is automatically added to the created message, wherein the message is an SMS message, and wherein the Web page location identifying information is added to the SMS message at an SMSC.

16. A method that provides a facsimile output of a desired Web page, said method comprising:
    creating a message at a communication device, the message including one of Web page location identifying information and facsimile machine location identifying information; and
    augmenting the message such that said message can cause facsimile printout of the identified Web page at the identified facsimile machine, wherein said created message includes facsimile machine location identifying information, and wherein the Web page location identifying information is automatically added to the created message, wherein a user enters the facsimile machine location identifying information in creating the message, and wherein the Web page location identifying information is automatically added to the created message, wherein the message is a WAP message, and wherein the Web page location identifying information is added to the WAP message at a WAP gateway.

17. A method for initiating a facsimile printout of a desired Web page, the method comprising:
    providing an SMS message including at least one of Web page location identifying information and facsimile machine location identifying information;
    receiving, at an SMSC, the SMS message; and
    receiving said message from the SMSC, and in response thereto providing the identified Web page to the identified facsimile machine for printout.

18. The method according to claim 17, wherein said Web page location is identified from a Uniform Resource Location (URL) of said identified Web page.

19. The method according to claim 17, further comprising sorting a plurality of different facsimile machine locations.

20. The method according to claim 19, wherein the message includes a selected one of the stored facsimile machine locations.

21. The method according to claim 19, wherein a user provides at least one of said facsimile location identifying information and said Web page location identifying information.

22. The method according to claim 17, wherein said facsimile machine location identifying information is obtained from a Web site.

23. The method according to claim 21, wherein the at one of said facsimile location identifying information and said Web page location identifying information is provided by one of a wireless telephone, a pager, and a Personal Digital Assistant (PDA).

24. A method for initiating a facsimile printout of a desired Web page, the method comprising:
    providing a WAP message including at least one of Web page location identifying information and facsimile machine location identifying information;
    receiving, at a WAP gateway, the WAP message; and
    receiving said message from the gateway, and in response thereto providing the identified Web page to the identified facsimile machine for printout.

25. The method according to claim 24, wherein said Web page location is identified from a Uniform Resource Location (URL) of said identified Web page.

26. The method according to claim 24, further comprising sorting a plurality of different facsimile machine locations.

27. The method according to claim 26, wherein the message includes a selected one of the stored facsimile machine locations.

28. The method according to claim 24, wherein a user provides at least one of said facsimile location identifying information and said Web page location identifying information.

29. The method according to claim 24, wherein said facsimile machine location identifying information is obtained from a Web site.

30. The method according to claim 24, wherein the at one of said facsimile location identifying information and said Web page location identifying information is provided by one of a wireless telephone, a pager, and a Personal Digital Assistant (PDA).

* * * * *